United States Patent
Dinkelmeyer et al.

(10) Patent No.: US 7,491,889 B2
(45) Date of Patent: Feb. 17, 2009

(54) ELECTRICAL LINE

(75) Inventors: Christof Dinkelmeyer, Lauf (DE); Patrick Odot, Autun (FR)

(73) Assignee: Nexans, Paris (FR)

( * ) Notice: Subject to any disclaimer, the term of this patent is extended or adjusted under 35 U.S.C. 154(b) by 0 days.

(21) Appl. No.: 11/716,530

(22) Filed: Mar. 9, 2007

(65) Prior Publication Data
US 2007/0246244 A1 Oct. 25, 2007

(30) Foreign Application Priority Data
Mar. 15, 2006 (EP) .................... 06290431

(51) Int. Cl.
*H01B 7/00* (2006.01)
(52) U.S. Cl. .................. 174/120 R
(58) Field of Classification Search ........ 174/120 R, 174/120 SR
See application file for complete search history.

(56) References Cited

U.S. PATENT DOCUMENTS 4,816,337 A * 3/1989 Schultz ................ 428/372
2006/0173123 A1* 8/2006 Yang et al. ................ 524/543

FOREIGN PATENT DOCUMENTS

| JP | 64089210 | 4/1986 |
| JP | 02123622 | 5/1990 |
| WO | WO0239560 | 5/2002 |
| WO | WO 2004114489 | 12/2004 |

* cited by examiner

*Primary Examiner*—Chau N Nguyen
(74) *Attorney, Agent, or Firm*—Sofer & Haroun, LLP

(57) ABSTRACT

An improved electrical line comprising an electrical conductor (5) and a layer of thermoplastic material wherein the layer consists of at least one inner layer (6) and one outer layer (7) and the outer layer (7) comprises a lubricant which has migrated from the inner layer (6) into the outer layer (7).

7 Claims, 1 Drawing Sheet

ELECTRICAL LINE

RELATED APPLICATION

The present application is related to and claims the benefit of priority from European Patent Application No. 06290431.3, filed on Mar. 15, 2006, the entirety of which is incorporated herein by reference.

FIELD OF THE INVENTION

The present invention relates to an electrical line, in particular an electrical line to be laid in cable ducts.

BACKGROUND

In order to reduce the time of installation of electrical lines in ducts it is very important, to reduce friction between the electrical line and the inner surface of the cable duct.

From WO 02/39560 A1 it is known to apply a friction-reducing layer to the inner surface of the duct. The friction-reducing layer is a lubricating particulate solid phase, which includes carbon black and a lubricating plastic material.

WO 2004/114489 A1 discloses a tube for installation of flexible cables. The tube comprises an outer layer of low-density polyethylene and an inner layer of high-density polyethylene containing a blend of polyamide and polyether block amides with a silicone slip agent.

On the other hand it is known to reduce the friction by providing the outer surface of the outermost layer (the sheath) with longitudinal or helical ribs. Such a solution is described in DE 8901210 U1.

JP 01089210A proposes a cable to be pulled into a duct wherein a lubricant layer for reducing a friction coefficient of the cable and a rip cord for tearing an outer sheath are interposed between an inner sheath and the outer sheath. When tearing off the outer sheath with the rip cord the friction coefficient between the inner sheath and the duct line inner wall is lowered by the lubricant layer. Thus, the cable can be introduced smoothly into the duct line without adding surplus tension to it.

Still another solution of the described problem is object of JP 02123622. To improve the self-lubricating ability a resin film layer is obtained by adding a predetermined amount of a specific lubricant to the insulating layer on a conductor. For instance 0.2-5.0 weight part of alkylphenoxypoly (ethylene oxide) ethanole are added to 100 weight part of the insulating resin.

One main problem of this solution is the compatibily between the slipperiness and the coil packaging film. It is not possible to move the coil of the electrical line provided with the lubricant without rigid boxes. This is a main drawback for the producer of such electrical lines.

OBJECTS AND SUMMARY

The object of the present invention is therefore that of providing an electrical line (or cable) with a layer, which is not slippery immediately after the production but which has a lubricating layer before it is drawn into ducts.

This object is achieved by the fact that the line comprises an inner layer and an outer layer and that the outer layer comprises a lubricant which has migrated from the inner layer into the outer layer.

Preferably the said lubricant is a wax of the group of fatty acid amides.

By way of example one can cite behenamide, oleamide, stearamide, erucamide, oleyl palmitamide, stearyl or ethylene bis-stearamide as a wax of the group of fatty acid amides.

According to a further embodiment of the invention the thermoplastic material of the inner layer is a halogene free, flame retardant compound based on copolymers of ethylene, as for instance Ethylene vinyl acetate (EVA).

The thermoplastic material of the outer layer may be the same material as for the inner layer. A polypropylene compound can be used by preference, too.

In a further preferred embodiment the ratio of the wall thickness of the inner and the outer layer is between 50:50 and 95:5.

The outer layer may be coloured in order to distinguish the lines, when more than one lines are positioned in one duct.

In a first embodiment the inner layer of thermoplastic material is extruded to the electrical conductor, whereby this material contains a lubricant, the outer layer is extruded to the inner layer, whereby the lubricant migrates at least partly from the inner layer to the outer layer over a period of at least two days, preferably at least one week.

The thermoplastic material of the inner layer is compounded with the lubricant and granulated.

Preferably the inner and the outer layer are coextruded.

In a further possibility of producing an electrical line according to the invention the inner layer of thermoplastic material is extruded to the conductor, the lubricant is applied to the inner layer and the outer layer is extruded to the inner layer coated with the lubricant. The lubricant will migrate at least partly from the surface of the inner layer into the outer layer in a period of time between two days and one week. The lubricant is applied to the inner layer preferably by spraying.

BRIEF DESCRIPTION OF THE DRAWINGS

Further characteristics and advantages of the present invention will become apparent from the following detailed description, made with reference to the attached drawings provided purely by way off non-limitative example, in which.

DETAILED DESCRIPTION

Figure 1:
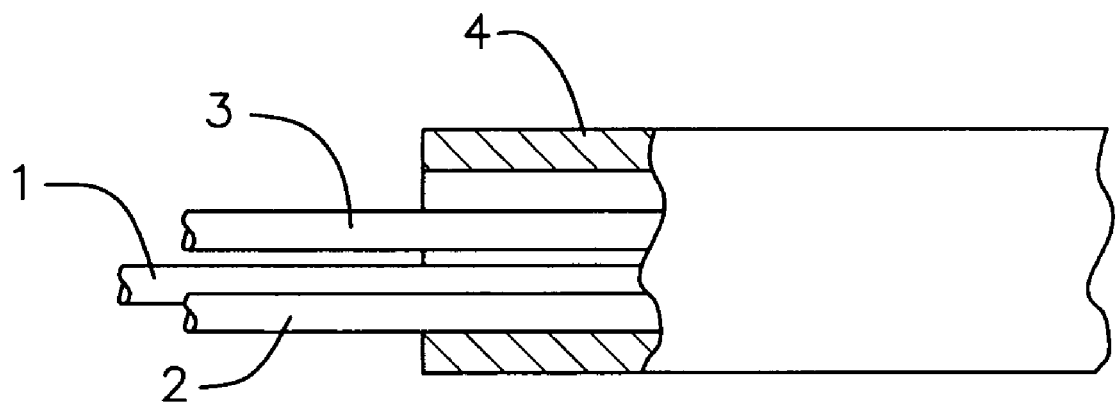
FIG. 1 is a view of a cable duct with three electrical lines therein and FIG. 2 is a view of an electrical line according to the invention.

In FIG. 1 three electrical lines 1, 2 and 3 are pulled into a cable duct 4. Each of the electrical lines 1, 2 and 3 has a layer 8 of lubricant on their outer surface in order to reduce friction between the inner surface of the cable duct 4 and the outer surface of the electrical lines 1, 2 and 3 during the installation of the electrical lines 1, 2 and 3 in the cable duct 4.

Figure 2:
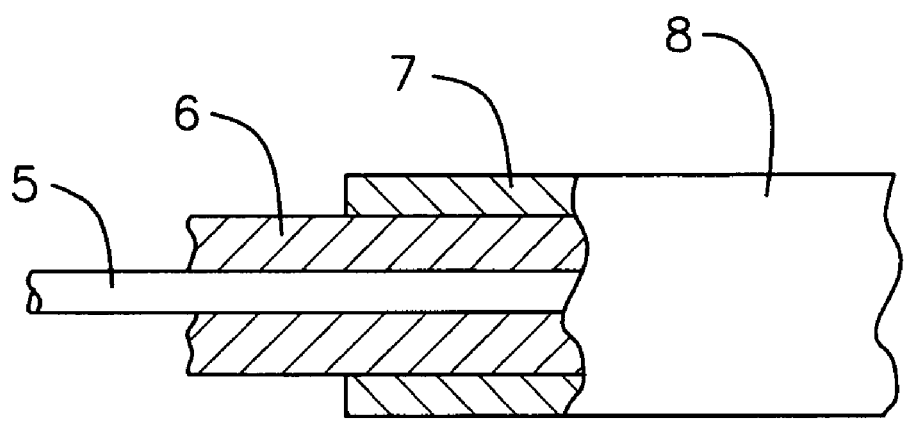

One embodiment of the invention is show in FIG. 2.

The electrical line comprises an electrical conductor 5 consisting of a plurality of twisted wires for example of copper or aluminium. Proceeding outwardly, the electrical conductor 5 is successively surrounded by a first inner layer 6 and a second outer layer 7.

The inner layer 6 and the outer layer 7 are produced by coextrusion.

Alternatively the inner layer 6 may be extruded first to the electrical conductor 5, then a wax of the group of fatty acid amides is applied to the outer surface of the inner layer 6 and at last the outer layer 7 is extruded to the inner layer 6.

Preferably layers 6 and 7 consist of a halogene free, flame retardant compound based on copolymers of ethylene. Alternatively the outer layer 7 may consist of a polypropylene compound.

A mixture used for the inner layer 6 and preferably for the layer 7 has for example the following formulation:

|  | parts by weight |
|---|---|
| EVA-Copolymer | 60 |
| PE-LL | 30 |
| PE-MAH grafted | 10 |
| Aluminiumhydroxide | 150 |
| Antioxidant | 1 |
| Searyl bis-stearamide | 0.5 |

The preferred materials for the EVA-Copolymer and the PE-LL are available from Exxon Chemical Co designated as "Escorene UL", and "Escorene LL". PW-MAH-grafted is available from Dupont and designated as "Fusabond".

A mixture used for the outer layer 7 has the same formulation but without Searyl bis-stearamide.

The Searyl bis-stearamide will migrate from the inner layer 6 or from the coating of the inner layer 6 into the outer layer 7 and will form a lubricating layer 8 on the surface of the outer layer 7.

The lubricant should not become effective on the surface of the layer 7 before one week and should be finished after four weeks.

The migration speed depends on the temperature in the layers 6 and 7, the concentration of the lubricant in the layers 6 and 7 and the wall thickness of the layers 6 and 7, especially of the layer 7. Therefore the ratio of the wall thicknesses of the layers 6 and 7 should be in the range of 50:50 and 95:5.

When more than one electrical lines 1, 2 or 3 have been installed in the duct 4 it is necessary to make it possible to identity the electrical lines. Therefore the outer layer 7 of the electrical line is coloured.

The invention claimed is:

1. Electrical line comprising:
   an electrical conductor; and
   a layer of thermoplastic material, wherein said layer of thermoplastic material includes at least one inner layer and one outer layer, wherein said outer layer has a lubricant which has migrated at least partly from the inner layer into the outer layer after substantially two days, and wherein the ratio of the wall thicknesses of said inner layer and said outer layer is between 50:50 and 95:5.

2. Electrical line according to claim 1, wherein the lubricant is a wax of the group of fatty acid amides.

3. Electrical line according to claim 1, wherein the thermoplastic material of the inner layer is a halogen free, flame retardant compound based on copolymers of ethylene.

4. Electrical line according to claim 1, wherein the thermoplastic material of the outer layer is a halogen free, flame retardant compound based on copolymers of ethylene.

5. Electrical line according to claim 1, wherein the thermoplastic material of the outer layer is a polypropylene compound.

6. Electrical line according to claim 1, wherein the outer layer is coloured.

7. Electrical line according to claim, 1, wherein said migration of said lubricant from said inner layer to said outer layer occurs within substantially the period of two days to one week.

* * * * *